United States Patent
Bailey, Jr.

(10) Patent No.: US 8,752,142 B2
(45) Date of Patent: Jun. 10, 2014

(54) SYSTEMS, METHODS, AND COMPUTER PROGRAM PRODUCTS FOR ADAPTING THE SECURITY MEASURES OF A COMMUNICATION NETWORK BASED ON FEEDBACK

(75) Inventor: Samuel A. Bailey, Jr., Boca Raton, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 665 days.

(21) Appl. No.: 12/504,828

(22) Filed: Jul. 17, 2009

(65) Prior Publication Data
US 2011/0016513 A1  Jan. 20, 2011

(51) Int. Cl.
*H04L 29/06* (2006.01)

(52) U.S. Cl.
USPC ................................. 726/5; 726/22

(58) Field of Classification Search
USPC .................. 726/5, 22–25; 713/188, 150, 154; 380/247, 270
See application file for complete search history.

(56) References Cited

U.S. PATENT DOCUMENTS

| | | | |
|---|---|---|---|
| 4,796,025 A | 1/1989 | Farley et al. | 340/825.08 |
| 5,053,956 A | 10/1991 | Donald et al. | 364/401 |
| 5,784,566 A | 7/1998 | Viavant et al. | 395/200.59 |
| 5,796,942 A | 8/1998 | Esbensen | 395/187.01 |
| 6,088,450 A | 7/2000 | Davis et al. | 380/25 |
| 6,321,338 B1 | 11/2001 | Porras et al. | |
| 6,330,546 B1 | 12/2001 | Gopinathan et al. | 705/35 |
| 6,484,182 B1 | 11/2002 | Dunphy et al. | |
| 6,530,024 B1 | 3/2003 | Proctor | 713/201 |
| 6,590,580 B2 | 7/2003 | Horikawa et al. | |
| 6,681,249 B2 | 1/2004 | Christensen et al. | 709/224 |
| 6,744,780 B1 * | 6/2004 | Gu et al. | 370/450 |
| 6,961,858 B2 | 11/2005 | Fransdonk | |
| 6,965,294 B1 | 11/2005 | Elliott et al. | 340/5.2 |
| 7,020,635 B2 | 3/2006 | Hamilton et al. | |
| 7,058,968 B2 | 6/2006 | Rowland et al. | |
| 7,080,049 B2 | 7/2006 | Truitt et al. | |

(Continued)

FOREIGN PATENT DOCUMENTS

| | | |
|---|---|---|
| CN | 1269030 A | 10/2000 |
| CN | 101300566 A | 11/2008 |

(Continued)

OTHER PUBLICATIONS

Selim Aissi et al., "Security for Mobile Networks and Platforms", Artech House Publishers (2006), 329 pages.

(Continued)

*Primary Examiner* — Ali Abyaneh
(74) *Attorney, Agent, or Firm* — Fitzpatrick, Cella, Harper & Scinto

(57) ABSTRACT

An adaptable network security system includes trust mediator agents that are coupled to each network component. Trust mediator agents continuously detect changes in the security characteristics of the network and communicate the detected security characteristics to a trust mediator. Based on the security characteristics received from the trust mediator agents, the trust mediator adjusts security safeguards to maintain an acceptable level of security. Trust mediator also uses predetermined rules in determining whether to adjust security safeguards. Despite inevitable changes in security characteristics, an acceptable level of security and efficient network operation are achieved without subjecting users of the network to over burdensome security safeguards.

18 Claims, 3 Drawing Sheets

(56) References Cited

U.S. PATENT DOCUMENTS

| | | | |
|---|---|---|---|
| 7,090,128 B2 | 8/2006 | Farley et al. | |
| 7,107,462 B2 | 9/2006 | Fransdonk | |
| 7,150,045 B2 | 12/2006 | Koelle et al. | |
| 7,152,242 B2 | 12/2006 | Douglas | |
| 7,174,462 B2 | 2/2007 | Pering et al. | 713/182 |
| 7,260,844 B1 | 8/2007 | Tidwell et al. | |
| 7,305,709 B1 | 12/2007 | Lymer et al. | |
| 7,565,693 B2 | 7/2009 | Shin et al. | |
| 7,587,502 B2 | 9/2009 | Crawford et al. | |
| 7,660,795 B2 | 2/2010 | Barrett et al. | |
| 7,685,254 B2 | 3/2010 | Pandya | 709/217 |
| 7,711,586 B2 | 5/2010 | Aggarwal et al. | |
| 7,835,721 B2* | 11/2010 | Tuulos et al. | 455/410 |
| 7,895,649 B1 | 2/2011 | Brook et al. | |
| 7,921,205 B2 | 4/2011 | Shen et al. | 709/224 |
| 7,937,353 B2 | 5/2011 | Bernoth et al. | |
| 8,001,054 B1 | 8/2011 | Peart et al. | |
| 8,074,282 B1 | 12/2011 | Lymer et al. | |
| 8,087,085 B2* | 12/2011 | Hu et al. | 726/24 |
| 8,117,458 B2 | 2/2012 | Osborn, III et al. | 713/183 |
| 8,146,160 B2 | 3/2012 | Orr et al. | |
| 8,406,119 B2 | 3/2013 | Taylor et al. | 370/216 |
| 2002/0129145 A1 | 9/2002 | Chow | 709/225 |
| 2003/0110392 A1 | 6/2003 | Aucsmith et al. | |
| 2003/0145226 A1 | 7/2003 | Bruton, III et al. | |
| 2004/0015719 A1 | 1/2004 | Lee et al. | |
| 2004/0030927 A1 | 2/2004 | Zuk | |
| 2004/0049698 A1 | 3/2004 | Ott et al. | |
| 2004/0187034 A1* | 9/2004 | Tamura et al. | 713/201 |
| 2005/0010768 A1 | 1/2005 | Light et al. | 713/168 |
| 2005/0091527 A1 | 4/2005 | Swander et al. | 713/201 |
| 2005/0125360 A1 | 6/2005 | Tidwell et al. | |
| 2005/0182969 A1* | 8/2005 | Ginter et al. | 713/201 |
| 2005/0201561 A1 | 9/2005 | Komano et al. | |
| 2006/0085839 A1 | 4/2006 | Brandt et al. | 726/2 |
| 2006/0090198 A1* | 4/2006 | Aaron | 726/6 |
| 2006/0161435 A1 | 7/2006 | Atef et al. | |
| 2006/0200427 A1 | 9/2006 | Morrison et al. | 705/67 |
| 2006/0200666 A1 | 9/2006 | Bailey, Jr. | |
| 2006/0225132 A1 | 10/2006 | Swift et al. | 726/11 |
| 2006/0276173 A1 | 12/2006 | Srey et al. | 455/410 |
| 2006/0291447 A1 | 12/2006 | Siliquini et al. | |
| 2007/0016955 A1 | 1/2007 | Goldberg et al. | 726/25 |
| 2007/0036314 A1 | 2/2007 | Kloberdans et al. | |
| 2007/0101432 A1 | 5/2007 | Carpenter | 726/25 |
| 2007/0143832 A1 | 6/2007 | Perrella et al. | |
| 2007/0234412 A1 | 10/2007 | Smith et al. | 726/11 |
| 2007/0250709 A1 | 10/2007 | Bailey, Jr. | |
| 2008/0086759 A1 | 4/2008 | Colson | |
| 2008/0098464 A1 | 4/2008 | Mizrah | 726/5 |
| 2008/0120707 A1 | 5/2008 | Ramia | 726/5 |
| 2008/0262990 A1 | 10/2008 | Kapoor et al. | |
| 2008/0270579 A1 | 10/2008 | Herz et al. | 709/219 |
| 2008/0307487 A1 | 12/2008 | Choyi et al. | |
| 2009/0125977 A1 | 5/2009 | Chander et al. | |
| 2009/0158425 A1 | 6/2009 | Chan et al. | 726/21 |
| 2009/0165125 A1 | 6/2009 | Brown et al. | |
| 2009/0216910 A1 | 8/2009 | Duchesneau | |
| 2009/0271844 A1 | 10/2009 | Zhang et al. | 726/2 |
| 2009/0300716 A1 | 12/2009 | Ahn | 726/1 |
| 2009/0328219 A1 | 12/2009 | Narayanaswamy | |
| 2010/0010874 A1 | 1/2010 | Howard et al. | 705/10 |
| 2010/0082513 A1 | 4/2010 | Liu | |
| 2010/0251388 A1 | 9/2010 | Dorfman | 726/29 |
| 2010/0275010 A1 | 10/2010 | Ghirardi | 713/155 |
| 2010/0294927 A1 | 11/2010 | Nelson et al. | |

FOREIGN PATENT DOCUMENTS

| | | |
|---|---|---|
| JP | 2009-110334 A | 5/2009 |
| JP | 2009-523275 A | 6/2009 |
| WO | 2009/021070 A1 | 2/2009 |

OTHER PUBLICATIONS

Zhigun Chen, "Java Card Technology for Smart Cards: Architecture and Programmers Guide", Prentice Hall (2000), pp. 57-63.

Clayton M. Christensen and Michael E. Raynor, "The Innovators Solution: Creating and Sustaining Successful Growth" Harvard Business Press (2003), pp. 31-71.

Edward T. Dowling, "Mathematical Methods for Business and Economics", McGraw-Hill (2009), pp. 89-127 and 177-196.

Robert Gibbons, "Game Theory for Applied Economists", Princeton University Press (1992), pp. 29-48 and 173-255.

Charles W. L. Hill and Gareth R. Jones, "Strategic Management Theory: An Integrated Approach", South-Western College Pub, 9th edition (2009), pp. 208-241.

Michael Howard and David Leblanc, "Writing Secure Code, Practical Strategies and Techniques for Secure Application Coding in a Networked World", Microsoft Press, 2nd ed. (2003), pp. 69-124, 259-298, and 455-476.

Ronald L. Krutz and Russell Dean Vines, "The CISSP Prep Guide, Mastering the Ten Domains of Computer Security", Wiley (2001), pp. 183-213.

Peter Morris, "Introduction to Game Theory", Springer Verlag New York, Inc. (1994), pp. 65-97.

Winn Schwartau, "Time Based Security", Interpact Press (1999), pp. 33-36, 65-74, and 121-125.

Shreeraj Shah, "Hacking Web Services", Charles River Media (2006), pp. 171-221, 271-298.

Colin English et al., "Dynamic Trust Models for Ubiquitous Computing Environments", University of Strathclyde, Glasgow, Scotland, Department of Computer and Information Sciences (2002).

Graham Messick, "Cyber War: Sabotaging the System" (Nov. 8, 2009), CBS Interactive Inc., http://www.cbsnews.com/stories/2009/11/06/60minutes/main5555565.shtml?tag=currentVideoInfo;segmentUtilities.

Peng Ning and Sushil Jajodia, "Intrusion Detection Techniques", http://discovery.csc.ncsu.edu/Courses/csc774-503/IDTechniques.pdf (last visited Sep. 24, 2010).

Brian Wotring, "Host Integrity Monitoring: Best Practices for Deployment" (Mar. 31, 2004), http://www.symantec.com/connect/articles/host-integrity-monitoring-best-practices-deployment.

Instituto Mexicano de la Propriedad Industrial (*Mexican Institute of Industrial Property*), Office Action in Mexican Patent Application No. MX/a/2012/000606, Feb. 28, 2013, pp. 1-3.

Fred B. Wrixon, "Codes Ciphers & Other Cryptic and Clandestine Communications, Making and Breaking Secret Messages from Hieroglyphs to the Internet", Black DogLrvrnthal Pub. (1998), pp. 298-309.

\* cited by examiner

SYSTEMS, METHODS, AND COMPUTER PROGRAM PRODUCTS FOR ADAPTING THE SECURITY MEASURES OF A COMMUNICATION NETWORK BASED ON FEEDBACK

BACKGROUND OF THE INVENTION

1. Field of the Invention

The present invention generally relates to information security systems, and more particularly, to systems, methods, and computer program products for adapting security measures of a communication network based on dynamic feedback.

2. Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign country may require the mobile communication device to roam on a foreign mobile communication network, which has inherently different security risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static once the system is deployed. A typical security system thus utilizes a particular set of security measures deployed until the security system is taken offline and either replaced or modified. In other words, if risks of the security system change, for example, by a breach of a security measure by an attacker, a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems. Moreover, the static security measures of typical security systems increase the ease with which internal and external attackers can circumvent the security measures. As payment and network systems adapt to next generation payment and communication, the attacks and exploits will also evolve into next generation criminal exploits.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for adapting the security measures of a communication network based on dynamic feedback.

Trust mediator agents are associated with each network component. The trust mediator agents continuously detect changes in the security characteristics of each network component and feed the detected changes back to a trust mediator. The trust mediator uses the feedback from trust mediator agents to determine whether and how to modify the currently running security safeguards in order to maintain an appropriate level of security. If any modifications are necessary, the trust mediator communicates the modifications to the appropriate network component via the associated trust mediator agent for implementation. The process is recursive and thus continuously adapts to changes in network security characteristics as they arise over time to strike a balance between the probability of loss plus magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact the new communication network will have on their existing network. Instead, the business entity can define rules, such as a threshold of acceptable risk, begin to communicate with the new network, and permit their existing security system to detect and adapt to the security characteristics of the new network while maintaining the acceptable risk acceptance level. Time-to-market is reduced, and the level of risk exposed to the business entity can be managed at minimized level.

Users' expectations regarding security measures are taken into account. Thus, if a particular security measure is too inconvenient for a user, the security measure is modified or disabled to a minimal level. The minimal level balances risk acceptance of a firm with convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure. This increases propensity for user satisfaction and thus movement towards equilibrium of strategy and payoff for usage of the system based on time, location, and relevance, and results in more efficient risk models to increase market share for the business entity.

In one embodiment, a security system is dynamically adapted based on security goals, threats, and characteristics of a communication network. Trust mediator agents collect security-related data associated with communication network modules, the trust mediator agents being associated with the network modules, respectively. At least one of the communication network modules is a mobile communication device. The trust mediator agents transmit the security-related data to a trust mediator over the communication network. In turn, the trust mediator determines, based on at least one of the security-related data transmitted by the trust mediator agents and a predetermined rule stored in a memory, modifications to one or more security safeguards. The trust mediator transmits instructions corresponding to the modifications to at least one of the trust mediator agents over the communication network or changes a protection profile associated with the communication network module.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Figure 1:
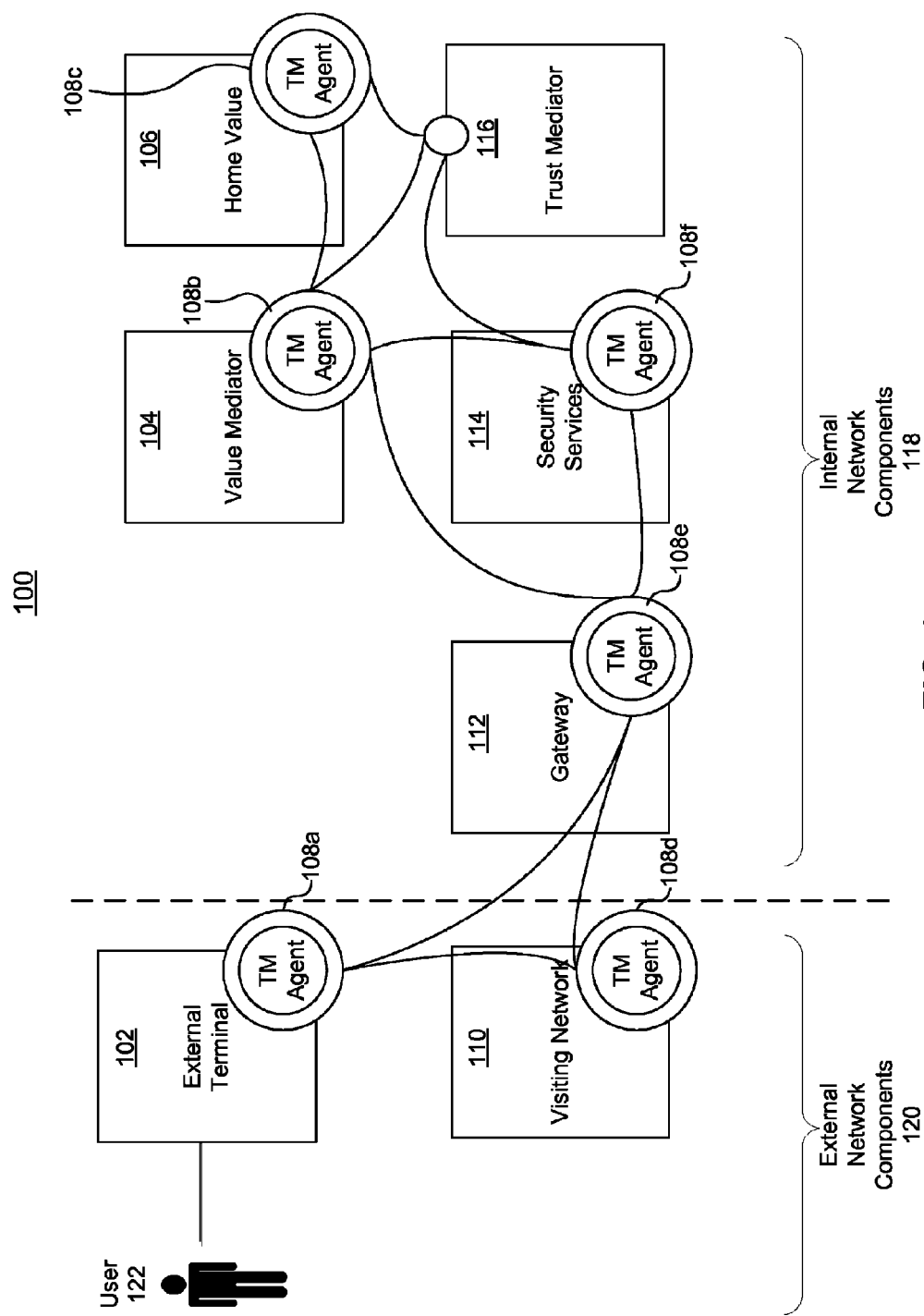
FIG. 1 is a diagram of an exemplary security system for adapting security measures of a communication network based on dynamic feedback, in accordance with an embodiment of the present invention.

The present invention is directed to systems, methods and computer program products for adapting security measures of a communication network based on dynamic feedback, which are now described in more detail herein in terms of an example mobile payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network, a wireless network, a telephone network, an intranet, the global, public Internet, and/or the like. Additionally, the user can complete transactions with the merchant using any suitable communication device, such as a point-of-interaction device (e.g., a point-of-sale (POS) device, a personal digital assistant (PDA), a mobile telephone, a kiosk, etc.), a radio frequency enabled transaction card, and/or the like.

A financial transaction instrument (also referred to as a "payment device") can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like.

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a Rich Site Summary (RSS) feed network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus enables quantification and exchange of value across different value-bases. In addition, by valuating these assets, value mediator 104 enables risk magnitude quantification associated with these assets to be computed by trust mediator 116. For example, if the value of the transaction or commerce was an asset calculated by value mediator 104, then this computed value is input to trust mediator 116 to react by changing one or more protections, countermeasures, or policies related to the asset.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as the TM agents 108 or trust mediator 116. Trust mediator 116, in turn, communicates instructions to TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

Figure 2:
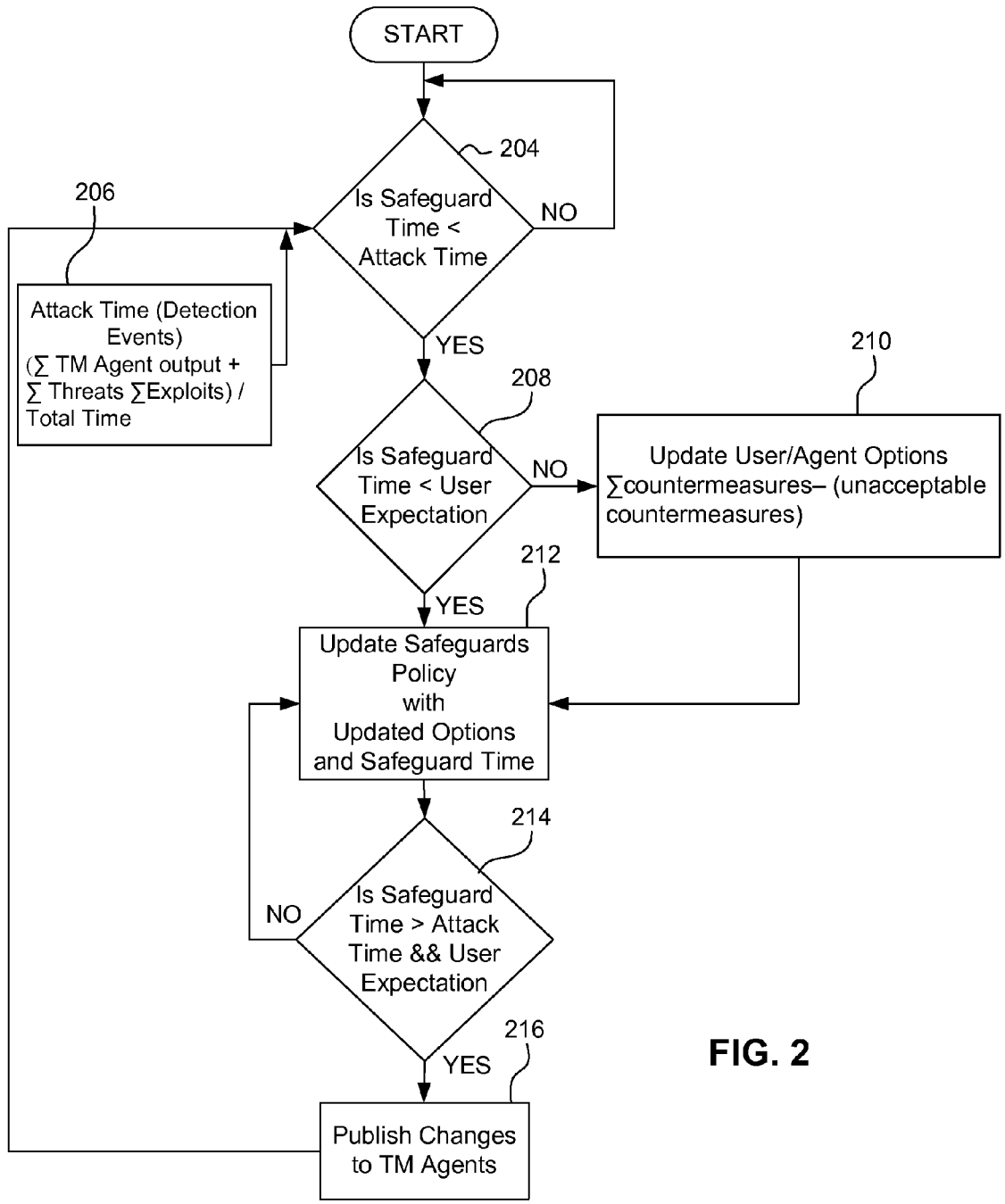
FIG. 2 is a flowchart illustrating an exemplary process for adapting security measures of a communication network based on dynamic feedback in accordance with an embodiment of the present invention.

FIG. 2 is a flowchart illustrating an exemplary process 200 for adapting security measures of a communication network based on dynamic feedback in accordance with an embodiment of the present invention. In this example embodiment, external terminal 102 is a mobile telephone. It should be understood, however, that the external terminal 102 is not limited to a mobile telephone. For example, a personal computer, a POS device, a personal digital assistant (PDA), a portable computing device, or the like, can be used instead and still be within the scope of the invention.

Referring to both FIGS. 1 and 2, variables used throughout process 200 are initialized with seed values. These variables are stored in a memory or other electronic storage device (not shown) located in one or more of internal network components 118. Example variables include values, attributes, and weighting factors for electronic assets, a user expectation of trust, a user expectation of convenience, an attack time, a safeguard time, a transaction location profile for user 122, a transaction time profile for user 122, etc. As process 200 progresses, the initial values of the variables are updated based on feedback processes and probes which are described in further detail below.

At block 206, one or more of TM agents 108a-108f detects an event. For example, TM agent 108a or 108b detects the connecting of external terminal 102 to visiting network 110, a request by external terminal 102 connected to visiting network 110 to complete a financial transaction, a request to associate a new external terminal 102 with a financial account of user 122, a change in a condition such as the time or location of external terminal 102, etc.

The other TM agents 108, either in parallel or in response to a detection made by TM agents 108a and 108b, can detect events such as the presence of a security threat associated with any of the internal and external network components 118 and 120, the safeguards currently in place for internal and external network components 118 and 120, information input by user 122 via external terminal 102 regarding expectation of safeguards, etc.

In response to any of TM agents 108a-108f detecting an event, the corresponding TM agent 108a-108f communicates updated information related to the event to trust mediator 116. Alternatively, or additionally, trust mediator 116 periodically polls one or more of TM agents 108a-108f for updated information at a rate determined by trust mediator 116 to be appropriate. For example, trust mediator 116 may poll TM agent 108a for data as to the location of external terminal 102 requesting multiple transactions. If data from TM agent 108a indicates a random shopping pattern because external terminal 102 is moving rapidly across different external network components 120 (e.g., because user 122 is on a train), trust mediator 116 can signal the other TM agents 108b-108f about this activity and poll more frequently.

A broad spectrum of risks are managed by dynamically measuring various risk factors using TM agents 108a-108f that are fed data from sensors. Each sensor measures a physical quantity and converts it into a signal that is stored as a risk variable by the TM agents 108a-108f, respectively, and is forwarded to the trust mediator 116, as necessary. For example, one type of sensor is a tactile sensor that converts vibrations into a signal that is stored in a corresponding risk variable, which in turn can be read by the TM agents 108a-108f and communicated to the trust mediator 116. Another example is a speed sensor that converts speed to a value that is stored in another risk variable. Another example is an accelerometer that senses and converts orientation, vibration, and/or shock into a value that is stored in another risk variable. Yet another example is a biometric sensor that senses and converts a physical characteristic of a human into a value that is stored in another risk variable. Still another example is a software sensor that senses changes in usage based on, e.g., input, output, location, etc., and stores the result in another risk variable.

Each external and internal network component 120 and 118 has one or more associated sensors feeding data to the respective TM agent 108a-108f, and the data is stored in a corresponding risk variable. The one or more risk variables associated with a particular network component can be grouped into clusters to derive one or more risk spaces for the network component. Different clusters and/or risk spaces can be derived by using different risk variables and/or different data collection techniques based on various data collection factors. For example, the cluster of risk variables for a particular network component can be dynamically changed by one or more of TM agents 108a-108f or trust mediator 116 based on the instant condition (e.g., environment, location, speed, etc.).

In one aspect, data for each risk space can be collected at a predetermined sampling rate from the sensors in the cluster by the respective TM agent 108a-108f. Sampling rates can be modified based on the instant condition, and/or based on security goals (e.g., goals regarding protection time, detection time, and reaction time, which are further described below).

In another aspect, TM agents 108 can communicate the data for each risk space to trust mediator 116 at a rate corresponding to the sampling rate.

In another aspect, data for each risk space can be communicated by one or more of TM agents 108a-108f to trust mediator 116 as a running summation of measurements collected over a predetermined integration time period. The integration time period can also be modified based on various data collection factors. For example, if the sample rate is set to 2 sample per second, and trust mediator 116 sets a 10 second integration period for a particular TM agent 108a-108f, then trust mediator 116 will receive summations of every consecutive 20 samples from the corresponding TM agent 108a-108f.

In yet another aspect, data for each risk space can be periodically communicated to trust mediator 116 in bursts of data (also referred to as block measurement). The intervals between the block measurements can also be modified based on data collection factors. In another aspect, TM agents 108 and/or trust mediator 116 can normalize the data that produces each risk space by computing a weighted and/or a non-weighted sum of the data from the sensors in the cluster.

The collection and/or use of the various risk variable data points is determined dynamically by trust mediator 116. For example, trust mediator 116 can change the clusters for each network component, and/or change the above-mentioned data collection rates and techniques, based on detected risks, goals (e.g., protection time, detection time, and reaction time), and/or other dynamic factors (e.g., data communicated to trust mediator 116 from one or more of TM agents 108a-108f). This provides system 100 with a greater adaptability and versatility when compared to typical security systems.

Typical network agents deny or grant access to network resources based on the current protection mechanisms. TM agents 108a-108f, however, use the sensors to detect any risk factors that impact a risk profile for each network component, and in response to the sensing, can not only deny or grant access based on the current protection mechanisms, but can also assist in changing the protection mechanisms so that access and commerce can continue. In this way, process 200 is dynamic in nature, as opposed to typical network security processes, which are static in nature.

Other information communicated by TM agents 108a-108f to trust mediator 116 includes information relating to safeguards currently deployed throughout system 100. Trust mediator 116 uses this information to compute safeguard time (which may also be referred to as protection time). In particular, trust mediator 116 computes safeguard time as the total amount of secure time provided by all the security safeguards that are currently in place in system 100 from end to end. Once trust mediator 116 computes safeguard time, the computed value of safeguard time replaces the initialized value of safeguard time discussed above.

TM agents 108a-108f communicate information to trust mediator 116 relating to current security threats present throughout system 100. Trust mediator 116 uses this information to compute attack time for the current threats. Attack time is an amount of time it would take for a detected threat to circumvent the currently running safeguards. For example, if a particular encryption algorithm is used as the current safeguard, then the attack time is the risk factor in time predicted for a computer with the average computing power to crack the protection mechanisms, which can include the encryption algorithm, pairing, and/or authentication, using brute force or cryptanalysis methods. Once trust mediator 116 computes the attack time, the computed value of attack time replaces the initialized value of attack time discussed above.

TM agent 108a receives user input from external terminal 102 relating to user expectation of trust and communicates this information to trust mediator 116. Trust mediator 116 uses this information to compute a user expectation of trust for user 122. User expectation of trust represents the level of protection required by user 122 in connection with particular transactions, and can be based on the type of transaction requested by user 122 via external terminal 102. For example, user 122 may require a higher level of security (and hence a higher safeguard time) for transactions over a certain amount of money. Once trust mediator 116 computes user expectation of trust, the computed value of user expectation of trust replaces the initialized value of user expectation of trust discussed above.

TM agent 108a also receives user input from external terminal 102 relating to user expectation of convenience and communicates this information to trust mediator 116. Trust mediator 116 uses this information to compute a user expectation of convenience for user 122. User expectation of convenience represents the maximum inconvenience that user 122 will accept in association with safeguards. User expectation of convenience also is based on the type of transaction requested by user 122 via external terminal 102. For example, user 122 may be unwilling to accept the inconvenience associated with requiring user 122 to submit to a biometric identification process, such as an iris scan, for a transaction of $5. Once trust mediator 116 computes user expectation of convenience, the computed value of user expectation of convenience replaces the initialized value of user expectation of convenience discussed above.

TM agents 108a-108f communicate information to trust mediator 116 relating to security threats of internal network components 118 and external network components 120. Trust mediator 116 stores this information in a memory (not shown) for use in quantifying security risk and determining the appropriate safeguards to counter the risk.

At block 204, trust mediator 116 compares the computed value of safeguard time to the computed value of attack time to determine whether the safeguard time provided by the currently running safeguards is less than the attack time. If trust mediator 116 determines that the safeguard time is greater than or equal to the attack time, then system 100 is considered secure, in other words, there is no time period during which the system 100 is exposed to threats. In this case, the procedure continuously repeats block 204 using updated information, if any, communicated at block 206 from TM agents 108 to trust mediator 116. In this way, the procedure is recursive and is able to continuously and dynamically adapt to changes in security characteristics.

If trust mediator 116 determines, however, that safeguard time is less than attack time, then the procedure continues to block 208. At block 208, trust mediator 116 determines whether the current safeguard time satisfies the computed user expectation of trust and the computed user expectation of convenience. This determination includes comparing the computed safeguard time against both the computed user expectation of trust and the computed user expectation of convenience. Safeguard time fails to satisfy the user expectation trust if the safeguard time provided by the currently running safeguards is less than the minimum security level user 122 will accept for the transaction (e.g., only requiring a mother's maiden name for a $10,000 transaction). Safeguard time also fails to satisfy the user expectation of convenience if the inconvenience associated with the currently deployed safeguards exceeds the maximum inconvenience user 122 will accept for the transaction (e.g., requiring an iris scan for a $5 transaction). If the trust mediator 116 determines that the safeguard satisfies both user expectation of trust and user expectation of convenience then the procedure progresses to block 210.

At block 210, user 122 uses external terminal 102 to input information relating to user expectation of trust, user expectation of convenience, and/or safeguards, as desired. Trust mediator 116 stores and uses this information to compute an equilibrium point that optimally balances user expectation of trust and user expectation of convenience for user 122 based on transaction characteristics. For example, if the stored user expectation data indicates that user 122 typically requires more rigorous safeguards (higher safeguard time) for transactions involving amounts above $1,000 than for those below $1,000, trust mediator 116 uses more rigorous safeguards for transactions above $1,000 and less rigorous safeguards for transactions below $1,000. This increases user's 122 satisfaction with system 100 because both trust and convenience are optimized and personalized for individual users 122.

After block 208 or block 210, as the case may be, the procedure progresses to block 212. If trust mediator 116 determines at block 208 that safeguard time satisfies user expectation of trust and user expectation of convenience, then at block 212 trust mediator 116 enables, disables, and/or modifies one or more safeguards according to the information input by user 122 at block 210, if any.

Alternatively, if trust mediator 116 determines at block 208 that safeguard time fails to satisfy user expectation of trust and/or user expectation of convenience, then at block 212 trust mediator 116 enables, disables, and/or modifies safeguards according to one or more trust mediation algorithm(s).

Example safeguard modifications include increasing a key length, changing an encryption algorithm, changing an authentication method, etc. Safeguard modifications help thwart attackers' attempts to circumvent safeguards. For example, changing an encryption key and/or an encryption algorithm during run-time increases the difficulty of an attacker successfully circumventing the encryption.

One variable that is used by trust mediator 116 in determining whether and/or how to modify safeguards for a transaction is the risk associated with transaction data (electronic assets) stored in and/or communicated throughout system 100. Trust mediator 116 computes risk as the product of a value (magnitude) of specific transaction data and the probability that the specific transaction data will be compromised.

The value of the specific transaction data is determined in one of two ways depending on the value-base of the specific transaction data. If the transaction data is based on a value-base stored in home value 106 (e.g., U.S. dollars, euros, etc.), then home value 106 computes the value of the specific transaction data based on that value-base. Home value 106 computes the value of the specific transaction data and communicates the value to trust mediator 116 for computing the risk associated with the specific transaction data.

If the specific transaction data is based on a value-base that is not stored in home value 106 (e.g., an unknown currency), then value mediator 104 computes the value of the specific transaction data using a valuation formula, which could be supported by one or multiple value transitions to reach like terms and comparable mediation weights. Value mediator 104 enables trust mediator 116 to assess risk for values not based on value-bases stored in home value 106, and enables transfer of value across value-bases. Inputs to the valuation formula include attributes of the specific transaction data as well as weighting factors corresponding to each of the attributes. Examples of the attributes of specific transaction data include: an owner of the specific transaction data, a time or location of the associated transaction, a currency of the specific transaction data, etc.

As mentioned above, if user 122 has not yet used system 100 to complete any transactions, then initialized values of the attributes and the weighting factors are used in the valuation formula. Over time, as user 122 completes transactions using system 100, the values of the attributes and the weighing factors are updated in the memory (not shown) and are used in the valuation and risk formula.

If the values of the attributes and weighing values converge over time, then trust mediator 116 uses the converged values of the attributes of a user's 122 transactions to assess risk of future transactions. These converged values are used by trust mediator 116 in computing the probability that specific transaction data will be compromised. For example, if the converged values for user 122 indicate that user 122 typically enters transactions during a particular time and/or at a particular geographical location, then trust mediator 116 increases the probability that specific transaction data will be compromised for any transaction from user 122 that originates at a different time and/or location than those indicated by the converged data. Conversely, trust mediator 116 decreases the probability that specific transaction data will be compromised for any transaction from user 122 that originates at approximately the time and/or location indicated by the converged data. Thus, exposure to risk is minimized through continuous dynamic improvement and convenience equilibrium for user 122 is maximized. Value mediator 104 transmits the computed value of the specific transaction data to trust mediator 116 for computing the risk associated with the specific transaction data.

As mentioned above, trust mediator 116 collects data from TM agents 108a-108f using various data collection techniques (e.g., cluster-based collection, event-based collection, and/or sampling rate-based collection, etc.). Trust mediator 116 can also periodically poll TM agents 108a-108f for information as to the time required for TM agents 108a-108f to detect threats (detection time). Trust mediator 116 also keeps track of the time taken for system 100 to react to previously detected threats by implementing adjusted safeguards (reaction time). If trust mediator 116 determines that safeguard time is less than the product of the detection time and the reaction time, then trust mediator 116 increases the rate at which it polls TM agents 108a-108f to decrease the detection time.

From block 212, the procedure progresses to block 214. At block 214, trust mediator 116 determines whether modifications to the safeguards determined at block 212 satisfy the attack time, the user expectation of trust, and the user expectation of convenience. If the trust mediator 116 determines that the safeguards fail to satisfy the attack time, the user expectation of trust, and/or the user expectation of convenience, then the procedure repeats block 212 to further modify the safeguards as needed. If trust mediator 116 determines that the safeguards satisfy the attack time, the user expectation of trust, and the user expectation of convenience, then the procedure progresses to block 216.

At block 216, the trust mediator 116 communicates the safeguard modifications to one or more of the TM agents 108a-108f. For instance, the trust mediator 116 communicates changes in safeguards relating to security services to security services module 114 to implement the new security services and safeguards (e.g., a different encryption/decryption algorithm). In this case, the safeguard modification is sent to at least two network components, namely, the component that performs the encrypting of data and the component that performs the decrypting of data. In one embodiment security services module 114 implements security applications based on the Diameter protocol and/or other authentication, authorization and accounting (AAA) protocols.

From block 216, the procedure repeats block 204 with new information communicated from TM agents 108 at block 206, if any exists. In this way, the procedure is recursive and thus is able to continuously and dynamically adapt to changes in the security situation as they arise over time and/or the particular location of external terminal 102. Users 122 can thus use their external terminals 102 to complete financial transactions using system 100 while experiencing an adaptive level of security that is both effective and convenient for user 122. Moreover, issuers can enable consumers to use their financial transaction accounts over their mobile telephones to complete transactions in various geographical locations, while maintaining an adaptive level of security that is effective and not over burdensome for user 122.

The present invention (e.g., system 100, process 200, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
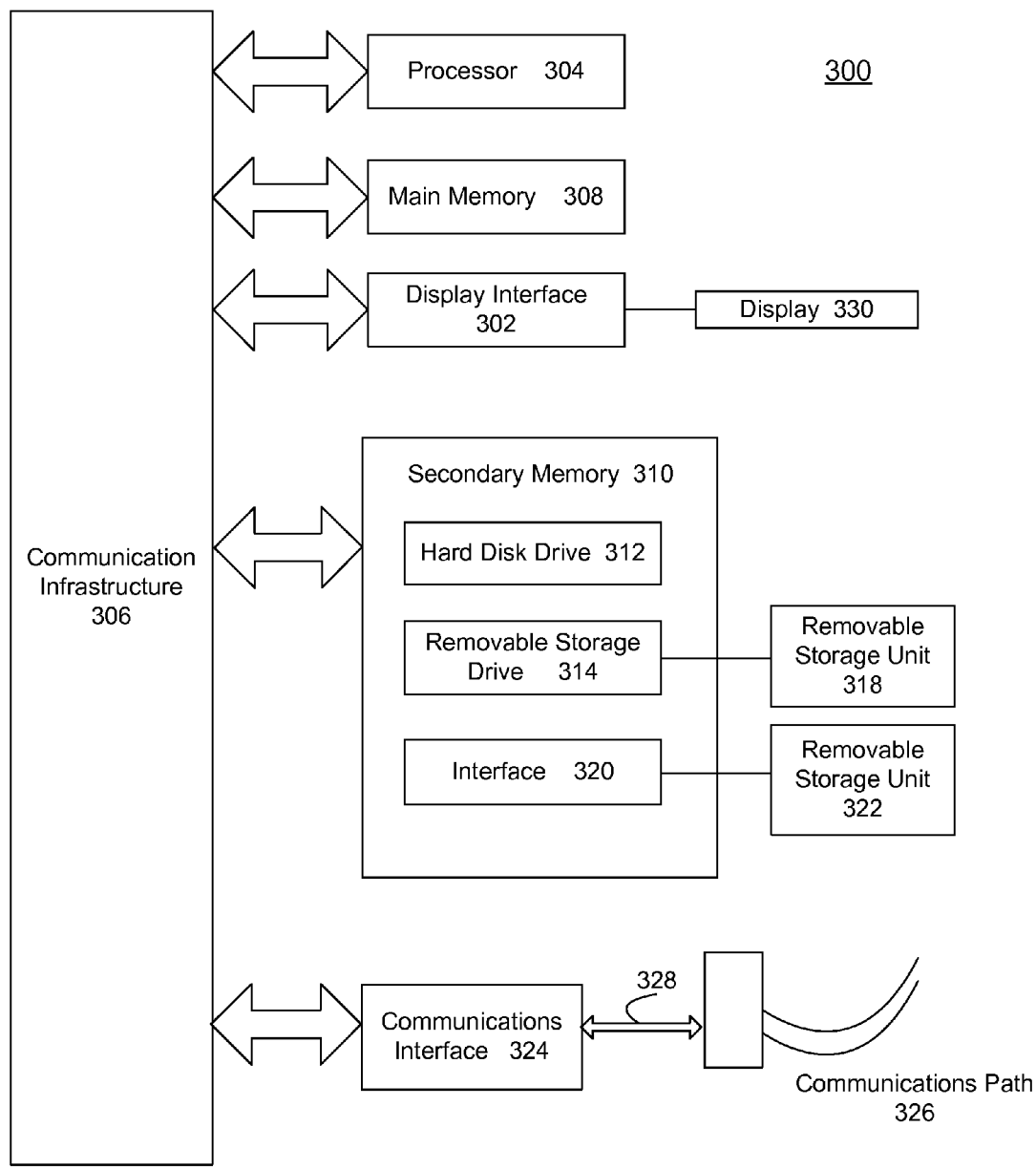
FIG. 3 is a block diagram of an exemplary computer system useful for implementing the present invention.

In fact, in one embodiment, the invention is directed toward one or more computer systems capable of carrying out the functionality described herein. An example of a computer system 300 is shown in FIG. 3.

Computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 can include other similar devices for allowing computer programs or other instructions to be loaded into computer system 300. Such devices can include, for example, a removable storage unit 322 and an interface 320. Examples of such can include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a Personal Computer Memory Card International Association (PCMCIA) slot and card, etc. Software and data transferred via communications interface 324 are in the form of signals 328 which can be electronic, electromagnetic, optical or other signals capable of being received by communications interface 324. These signals 328 are provided to communications interface 324 via a communications path (e.g., channel) 326. This channel 326 carries signals 328 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 314, a hard disk installed in hard disk drive 312, and/or signals 328. These computer program products provide software to computer system 300. The invention is directed to such computer program products.

Computer programs (also referred to as computer control logic) are stored in main memory 308 and/or secondary memory 310. Computer programs can also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software can be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for adapting a security system based on security-related data associated with a communication network, the method comprising:
    collecting, by a plurality of trust mediator agents, security-related data associated with a plurality of communication network modules, the plurality of trust mediator agents being associated with the plurality of communication network modules, respectively,
    wherein at least one of the plurality of communication network modules is a mobile communication device operable to make a request to complete a financial transaction,
    wherein the security-related data is collected for one or more risk variables generated by one or more sensors, correspondingly, and selected by a trust mediator based on location data associated with the mobile communication device, and
    wherein the security-related data for the one or more risk variables selected by the trust mediator is collected periodically at a time interval determined by the trust mediator based on the location data associated with the mobile communication device;
    transmitting, by the plurality of trust mediator agents, the security-related data to the trust mediator over the communication network;
    determining, by the trust mediator, based on at least one of the security-related data transmitted by the trust mediator agents and a predetermined rule stored in a memory, modifications to one or more security safeguards; and
    transmitting, by the trust mediator, instructions corresponding to the modifications to at least one of the plurality of trust mediator agents over the communication network.

2. The method of claim 1, further comprising the step of determining, by the trust mediator, that a safeguard time provided by the one or more security safeguards meets at least one of an attack time and a user expectation.

3. The method of claim 1, wherein the security-related data includes at least one of threat data corresponding to at least one of the plurality of communication network modules, user expectation data, a list of currently running security safeguards, and a protection time provided by the currently running security safeguards.

4. The method of claim 1, wherein the instructions corresponding to the modifications are based on a security safeguard modification request received from the mobile communication device over the communication network.

5. The method of claim 1, wherein at least one of the collecting and transmitting security-related data is performed by the plurality of trust mediator agents based on at least one of a predetermined repetition rate and a detection of an event.

6. The method of claim 5, wherein the event includes receiving, by at least one of the plurality of trust mediator agents, the request to complete the financial transaction from the mobile communication device.

7. An adaptive security system for a communication network, the system comprising:

a plurality of communication network modules, including a mobile communication device operable to make a request to complete a financial transaction, interconnected over the communication network;

a plurality of trust mediator agents coupled to the plurality of communication network modules, respectively, the trust mediator agents being configured to collect, periodically at a time interval, security-related data for one or more risk variables generated by one or more sensors, correspondingly, associated with the plurality of communication network modules; and a trust mediator coupled to a memory, and configured to:
  select the one or more risk variables based on location data associated with the mobile communication device,
  determine the time interval based on the location data associated with the mobile communication device,
  receive over the communication network, the security-related data from the plurality of trust mediator agents,
  determine, based on at least one of the security-related data transmitted by the trust mediator agents and a predetermined rule stored in the memory, modifications to one or more security safeguards, and
  transmit instructions corresponding to the modifications to at least one of the plurality of trust mediator agents over the communication network.

8. The system of claim 7, wherein the trust mediator is further configured to determine that a safeguard time provided by the one or more security safeguards meets at least one of an attack time and a user expectation.

9. The system of claim 7, wherein the security-related data includes at least one of threat data corresponding to at least one of the plurality of communication network modules, user expectation data, a list of currently running security safeguards, and a protection time provided by the currently running security safeguards.

10. The system of claim 7, wherein the instructions corresponding to the modifications are based on a security safeguard modification request received from the mobile communication device over the communication network.

11. The system of claim 7, wherein the plurality of trust mediator agents are configured to collect and transmit security-related data to the trust mediator based on at least one of a predetermined repetition rate and a detection of an event.

12. The system of claim 11, wherein the event includes receiving, by at least one of the plurality of trust mediator agents, the request to complete the financial transaction from the mobile communication device.

13. A non-transitory computer-readable medium having stored thereon sequences of instructions, the sequences of instructions including instructions which when executed by a computer system cause the computer system to perform:
  collecting, by a plurality of trust mediator agents, security-related data associated with a plurality of communication network modules, the plurality of trust mediator agents being associated with the plurality of communication network modules, respectively,
  wherein at least one of the plurality of communication network modules is a mobile communication device operable to make a request to complete a financial transaction,
  wherein the security-related data is collected for one or more risk variables generated by one or more sensors, correspondingly, and selected by a trust mediator based on location data associated with the mobile communication device, and
  wherein the security-related data for the one or more risk variables selected by the trust mediator is collected periodically at a time interval determined by the trust mediator based on the location data associated with the mobile communication device;
  transmitting, by the plurality of trust mediator agents, the security-related data to the trust mediator over the communication network;
  determining, by the trust mediator, based on at least one of the security-related data transmitted by the trust mediator agents and a predetermined rule stored in a memory, modifications to one or more security safeguards; and
  transmitting, by the trust mediator, instructions corresponding to the modifications to at least one of the plurality of trust mediator agents over the communication network.

14. The non-transitory computer-readable medium of claim 13, wherein the sequences of instructions further include instructions which when executed by the computer system cause the computer system to perform:
  determining, by the trust mediator, that a safeguard time provided by the one or more security safeguards meets at least one of an attack time and a user expectation.

15. The non-transitory computer-readable medium of claim 13, wherein the security-related data includes at least one of threat data corresponding to at least one of the plurality of communication network modules, user expectation data, a list of currently running security safeguards, and a protection time provided by the currently running security safeguards.

16. The non-transitory computer-readable medium of claim 13, wherein the instructions corresponding to the modifications are based on a security safeguard modification request received from the mobile communication device over the communication network.

17. The non-transitory computer-readable medium of claim 13, wherein at least one of the collecting and transmitting security-related data is performed by the plurality of trust mediator agents based on at least one of a predetermined repetition rate and a detection of an event.

18. The non-transitory computer-readable medium of claim 17, wherein the event includes receiving, by at least one of the plurality of trust mediator agents, the request to complete the financial transaction from the mobile communication device.

* * * * *